UNITED STATES PATENT OFFICE 1,971,436

COMPOUND OF THE POLYARYLMETHYL SERIES AND THE PROCESS FOR PREPARING THE SAME

Max Weiler, Leverkusen-Wiesdorf, near Cologne-on-the-Rhine, Germany, assignor to I. G. Farbenindustrie Aktiengesellschaft, Frankfort-on-the-Main, Germany No Drawing. Application February 24, 1932, Serial No. 594,961. In Germany March 7, 1931

21 Claims. (Cl. 260—64)

The present invention relates to a process of preparing new condensation products from phenols which are substituted in both ortho-positions as well as in the para-position and aldehydes and to the new compounds obtainable thereby. More particularly it relates to compounds of the probable general formula:

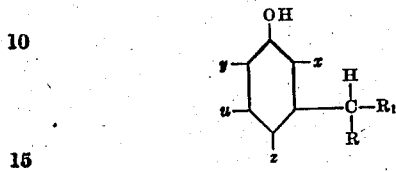

wherein $x$, $y$ and $z$ each stand for a halogen atom or an alkyl radical, $u$ represents hydrogen or an alkyl radical which may be substituted by a halogen atom, R stands for an aryl radical which may contain one or more monovalent substituents of the group consisting of a halogen atom, hydroxy group, nitro group and sulfonic acid group which sulfonic acid group may contain a metal or an equivalent thereof in place of hydrogen, and $R_1$ stands for hydrogen, a hydroxy group an etherified or esterified hydroxy group or a phenolic radical which may contain substituents, such as halogen atoms and/or an alkyl radical.

The new compounds are generally obtainable by reacting with an aldehyde or substituted products thereof, such as formaldehyde, halogenated, nitrated or sulfonated benzaldehydes, upon a phenol which is substituted in both ortho-positions as well as in the para-position to the hydroxy group by halogen atoms or alkyl radicals, but which contains at least one free meta-position to the hydroxy group. In place of the above mentioned phenols mixtures thereof may also be used. According to the mode of procedure either diaryl or triarylmethane derivatives are directly obtained by condensing with the aid of acid condensing agents, such as sulfuric acid, fuming sulfuric acid or chloro-sulfonic acid or sulfuric acid + glacial acetic acid and the like, one molecular quantity of an aldehyde with a double molecular quantity of a phenol as mentioned above or a quantity of a phenol as mentioned above or a mixture thereof. Hydrols, or their derivatives or their anhydrides are obtainable at first by using equal molecular quantities of the starting materials. These hydrols are then allowed to further condense with the second molecular quantity of the same or of another phenol, such as para-chlorophenol or 2,4-dichlorophenol, to form triarylmethane derivatives whereby the same acid condensation agents are applied.

The temperature at which the reaction takes place varies within wide limits, but may range in most cases from about 15 to about 100° C.; the same is to be said about the time required for finishing the condensation process which may vary from about 3 hours to about 2 days.

My new products are generally colorless or nearly colorless powders which are soluble in alkalies, almost insoluble in water, except those which contain a free sulfonic acid group, and are generally highly efficacious in protecting wool, hair and the like against moths or other insect pests.

This invention is illustrated by the following examples, but without limiting it thereto. The parts are by weight.

*Example 1.*—20.8 parts of sodium benzaldehyde-para-sulfonate and 41 parts of 2,4,6-trichlorophenol (2.08 mols) are stirred with 200 parts of sulfuric acid of 100% strength at a temperature of about 50 to 60° C. for about 19 hours until only traces of trichlorophenol are still detectable. The melt is poured on 100 parts of ice, the crystalline powder which separates is filtered off and washed with some diluted sulfuric acid. The remainder is mixed with such a quantity of sodium carbonate that the solution shows only a weakly Congo acid reaction and is then freed from traces of trichlorophenol by means of steam. The residue coagulates, on cooling, in the form of a paste of colorless crystals which are filtered off and washed with water. The sodium 3,3'-dihydroxy-2,2',4,4'-6,6'-hexachlorotriphenylmethane-4''-sulfonate thus obtained is rather difficultly soluble in hot water and difficultly soluble in cold water. The new substance corresponds to the formula:

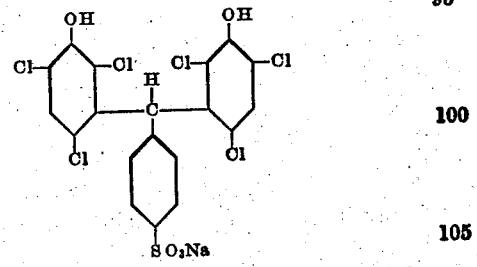

(sodium salt) and represents colorless crystals difficultly soluble in cold water. The Ba-, Zn-, Cu(II)-, and Al-salts form white, difficultly soluble needles. By means of iron chloride (FeCl₃) a thick violet precipitate is obtained, which is completely dissolved to form a red violet colored solution by shaking with ether. In pure, concentrated sulfuric acid the triphenylmethane substance dissolves to form a completely colorless solution. Wool or substances containing keratin, which have been impregnated with this compound in the same manner as the acid dyestuffs, are no longer subject to attack by moth-worms and other textile pests. The sodium 3,3'-dihydroxy-2,2'-dimethyl-4,4'-6,6'-tetra-chlorotriphenylmethane-4''-sulfonate obtained in a similar manner from 1 mol. of benzaldehyde-para-sulfonic acid and 2 mols of 2-methyl-4,6-dichlorophenol at a temperature of about 50–55° C. is much more easily soluble in water and yields no difficultly soluble precipitates with Zn and Cu(II) salts, which is the case with Al-salts. The condensation of 1 mol. of benzaldehyde-para-sulfonic acid with 2 mols of 3-methyl-2,4,6-trichlorophenol is carried out under the same conditions, but with far more difficulty. The sodium 3,3'-dihydroxy-5,5'-dimethyl-2,2',4,4',6,6'-hexachlorotriphenylmethane-4''-sulfonate possesses similar properties as the last mentioned sodium triphenylmethane sulfonate.

Instead of the said phenols also a raw cresol or a technical mixture of meta- and para-cresol can be used, which have been substituted before in all ortho- and para-positions to the hydroxy group by means of chlorine.

In place of the benzaldehyde-para-sulfonic acid, the 2-chlorobenzaldehyde-5-sulfonic acid can be condensed with 2 mols of symmetrical trichlorophenol in a similar manner to form the 3,3'-dihydroxy-2,2'-2''-4,4'-6,6'-heptachlorotriphenylmethane-5''-sulfonic acid. The sodium salt is rather easily soluble, the salts with Zn, Cu(II), Al are rather difficultly soluble, and on cooling the hot solutions they separate in form of crystals.

*Example 2.*—83.2 parts of benzaldehyde-orthosulfonic acid sodium and 81 parts of 2,4,6-trichlorophenol (1.025 mols) are stirred with 800 parts of fuming sulfuric acid of about 8–11% strength at about 35–40° C. for about 20 to 24 hours until the trichlorophenol has almost completely disappeared from a test portion. The melt is poured on ice and small quantities of trichlorophenol which are still present are blown off with steam. The bulk of the hydrolanhydride is separated from the residue in the form of a white, crystalline powder. It is filtered off and washed with water. The remainder of the hydrol is obtained in an excellent yield as free sulfonic acid in the filtrate and separates in the form of the anhydride on concentrating the solution on the water bath. The anhydride melts at about 237° C. It is rather soluble in alcohol and almost insoluble in water. However, it is split up to form the free hydrol-sulfonic acid by means of water or by diluted acid after boiling for a prolonged time or already by boiling for a short time with a solution of diluted sodium carbonate or still more easily by a diluted soda lye. The free hydrol-sulfonic acid is easily soluble in water and separated by highly concentrated hydrochloric acid as a resin. When boiling in strong hydrochloric acid, the free hydrol-sulfonic acid is converted again into its anhydride which is almost insoluble in water. In concentrated sulfuric acid the anhydride dissolves only with difficulty and without any color. This new compound has the formula:

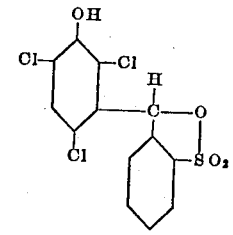

*Example 3.*—20.8 parts of sodium benzaldehyde-para-sulfonate and 20.5 parts of 2,4,6-trichlorophenol (1.04 mols) are stirred with 200 parts of fuming sulfuric acid of 8% strength at about 30–35° C. for about 20 hours until a test portion only contains traces of trichlorophenol. The melt is poured into 400 parts of a sulfuric acid of 78% strength. The granular precipitate is filtered off and washed with a mixture of 1 part of a 100% sulfuric acid and 2 parts of a 78% sulfuric acid. The remainder is dissolved in water, neutralized with sodium carbonate to a weakly Congo acid reaction and freed from any traces of trichlorophenol by means of steam. The strongly concentrated residue coagulates in the form of a paste of the sodium hydrol sulfonate. This is very easily soluble in water and yields no difficultly soluble precipitates with Zn, Cu(II) or Al-salts. On using iron chloride the solution is dyed with strong red-violet shades without yielding any precipitate. Contrary to the triphenylmethane substance mentioned in Example 1, the aqueous solution of the iron salt, when shaking with ether, stays violet, the ethereal solution remains without any color. The hydrol dissolves in concentrated sulfuric acid to form a lemon-yellow solution. Contrary to the isomer mentioned in Example 2 the hydrol-para-sulfonic acid forms no anhydride under the conditions mentioned therein. The new substance (sodium salt) corresponds to the formula:

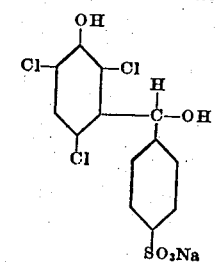

In a similar manner as the 2,4,6-trichlorophenol also the benzaldehyde-para-sulfonic acid is condensed with 2-methyl-4,6-dichlorophenol to form hydrol.

3-methyl-2,4,6-trichlorophenol and 2,4-6-tribromophenol are condensed much more difficultly with the same aldehyde and require a little stronger fuming sulfuric acid. In order to separate these hydrols, it is advantageous to add such a quantity of ice to the melt that no precipitates are obtained when adding more ice to a test portion of the filtrate.

This point is almost reached at an acid concentration of 78% strength. Then the hydrol is filtered off and washed with sulfuric acid of the same concentration. The free hydrols form easily soluble salts with Na, Cu(II) and Al.

*Example 4.*—As mentioned in Example 3 the hydrol is prepared from equimolecular proportions of benzaldehyde-para-sulfonic acid and 2,4,6-trichlorophenol, the sulfuric acid of the melt is carefully diluted while stirring with sulfuric acid of about 75% strength to about 95–90% in such a manner that the hydrol remains in solution. 17.1 parts of 2,4-dichlorophenol are then added thereto and the temperature is raised to about 40 to 60° C. for about 1 to 2 days depending upon the acid concentration. When the precipitation of the mixed triphenylmethane is complete, it is filtered off and washed with sulfuric acid of the same concentration. The remainder is neutralized with sodium carbonate to weakly Congo acid reaction and freed from chlorophenols by means of steam. When concentrating the residue, the sodium 3,2'-dihydroxy-2,4,6,3', 5'-penta-chlorotriphenylmethane - 4'' - sulfonate is separated in the form of a white resin which is rather easily soluble in cold water and easily soluble in hot water. The new product (sodium salt) has the formula:

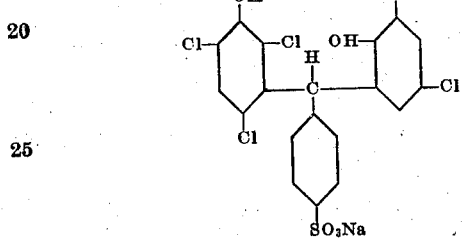

There is no immediate separation with zinc- or copper sulfate, but this separation can be obtained by the subsequent addition of some sodium chloride. However, a thick flockly precipitate is obtained at once with aluminium sulfate.

The said hydrol, as contained in fuming sulfuric acid, can also be condensed, after a dilution with about 75% sulfuric acid to about 83%, with para-chlorophenol at a temperature of 50° C. The separated sodium 3, 2'-dihydroxy-2, 4, 6, 5'-tetrachlorotriphenylmethane-4''-sulfonate is worked up in a similar manner as above mentioned. It is more easily soluble in water and also forms with the said three heavy metals more easily soluble salts which can only be separated by the addition of considerable quantities of sodium chloride. Wool is rendered moth-proof by impregnating with the two mixed triphenylmethanes.

*Example 5.*—30.2 parts of meta-nitrobenzaldehyde are introduced into 300 parts of a fuming sulfuric acid of 7.5% strength and then 40 parts of 2, 4, 6-trichlorophenol are added thereto. The temperature is slowly raised to 55° C. and maintained at about 55 to 60° C. until the components have almost completely disappeared from a test portion. The hydrol formed is obtained by pouring the melt on ice, by filtering off the hydrol and by blowing off with steam the small quantities of trichlorophenol which are still present. The hydrol filtered off from the hot residue, can further be purified by dissolving in a lye and precipitating with an acid. It dissolves in a concentrated sulfuric acid or also in a caustic soda lye forming weakly brown solutions and possesses the formula:

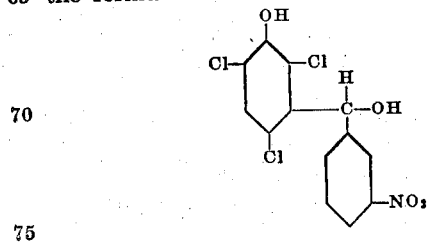

17.4 parts of this hydrol, which can also be used without separating it from the melt, are introduced into 190 parts of 94.8% sulfuric acid and then mixed with 9 parts of 2, 4-dichlorophenol. By heating to 40° C. the emulsion, which is present at first, gradually dissolves. After some time the compound formed separates as resin. The formation of the triphenylmethane derivative is completed by further heating to about 55–60° C. As soon as dichlorophenol cannot be detected any more in a test portion, it is poured on ice, freed from traces of chlorophenols which are still present by means of steam, and the 3,2'-dihydroxy-2, 4, 6, 3', 5'-penta-chloro-3''-nitrotriphenylmethane is filtered off. It can further be purified by dissolving in a lye and precipitating with acid. It possesses the formula:

Wool which is impregnated with the substance either from organic solvents or according to the said dyeing process is rendered moth-proof thereby. The para-nitrobenzaldehyde acts in the same manner as the meta-nitrobenzaldehyde. In place of these two aldehydes their equivalents, for instance, the corresponding nitrobenzalchlorides may be used.

*Example 6.*—102.3 parts of technical 2, 4, 6-trichlorophenol containing still 3.6% of dichlorophenol are introduced into 400 parts of a 100% sulfuric acid. The mixture is heated to about 95–100° C. for one hour, while quickly stirring, whereby only the dichlorophenol is sulfonated. After cooling to 55° C. 100 parts of glacial acetic acid are introduced, and then 7.9 parts of a 97.2% para-formaldehyde dissolved in 120 parts of a 100% sulfuric acid and 30 parts of glacial acetic acid are added thereto at about 95–100° C. within 45 minutes. This temperature is maintained until formaldehyde cannot be detected any more. After cooling, the condensation product, separated for the most part already, from the hot solution, is filtered off, washed with concentrated glacial acetic acid, then with diluted acid and finally with water. The pulverized product is freed from some trichlorophenol by means of steam and can be recrystallized from glacial acetic acid for a complete purification. The used double compound formed therewith is split off again by means of steam. The pure 3, 3'-dihydroxy-2, 2', 4, 4', 6, 6'-hexachlorodiphenylmethane thus obtained melts at 211° C., it is easily soluble in 2 mols of a caustic soda lye and has excellent poisonous effect against moths, bacteria and fungi. It corresponds to the formula:

*Example 7.*—17 parts of a 97.2% para-formaldehyde are dissolved in 400 parts of chlorosulfonic acid, and then 98.8 parts of trichlorophenol are slowly introduced while cooling with ice water. It is stirred at 20° C. until no hydrochloric acid escapes any more and until the trichlorophenol has disappeared (after 12 to 24 hours). Then it is poured on ice, filtered and washed with water. The filtrate contains only a small quantity of formaldehyde which has not been converted. The remainder is treated with ether containing 1/5 part by volume of benzene. The undissolved mass is filtered off and washed with ether-benzene. The residue is a white powder which cannot be molten even at a higher temperature.

The ether and a part of the benzene are distilled off from the filtrate. The white, paste-like residue is filtered off and washed with benzene. Likewise, it is a white powder also not melting at higher temperatures. According to the experimental conditions the proportion of these two products change. With regard to the analysis and the molecular weight determination the two products appear to be high molecular hydroxy-dibenzyl ethers, the nuclei of which still contain an ω-chloromethyl group for a small part, the chlorine of which is split off even on dissolving in a cold, very diluted caustic soda lye. The new substances most probably contain a compound of the formula:

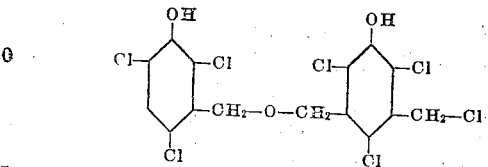

The reaction is carried out in a rather different manner, if equal molecular quantities of the components are condensed in a concentrated sulfuric acid:

I claim:

1. The process which comprises causing one molecular quantity of an aldehyde and at least one molecular quantity of a phenol which is substituted in both ortho-positions as well as in the para-position to the hydroxy group by a halogen atom or an alkyl radical, but which contains at least one halogen atom and at least one free meta-position to the hydroxy group, to react upon each other in the presence of an acid condensation agent.

2. The process which comprises causing one molecular quantity of an aldehyde and two molecular quantities of a phenol or mixtures of different phenols which are substituted in both ortho-positions as well as in the para-position to the hydroxy group by a halogen atom or an alkyl radical, but which contain at least one halogen atom and at least one free meta-position to the hydroxy group, to react upon each other in the presence of an acid condensation agent at a temperature of from about 15 to about 100° C. and for a time ranging from about 3 hours to about 2 days.

3. The process which comprises causing one molecular quantity of an aromatic aldehyde which may be substituted in the nucleus by a halogen atom, a nitro group or by a sulfonic acid group or a halogen atom and a sulfonic acid group and two molecular quantities of a phenol or mixtures of different phenols which are substituted in both ortho-positions as well as in the para-position to the hydroxy group by a halogen atom or an alkyl radical, but which contain at least one halogen atom and at least one free meta-position to the hydroxy group, to react upon each other in the presence of an acid condensation agent at a temperature of from about 15 to about 100° C. and for a time ranging from about 3 hours to 2 days.

4. The process which comprises causing one molecular quantity of sodium benzaldehyde-para-sulfonate and two molecular quantities of 2,4,6-trichlorophenol to react upon each other in sulfuric acid of 100% strength for about 19 hours at about 50 to about 60° C.

5. The process which comprises causing one molecular quantity of an aldehyde and one molecular quantity of a phenol which is substituted in both ortho-positions as well as in the para-position to the hydroxy group by a halogen atom or an alkyl radical, but which contains at least one halogen atom and at least one free meta-position to the hydroxy group, to react upon each other in the presence of an acid condensation agent.

6. The process which comprises causing one molecular quantity of an aldehyde and one molecular quantity of a phenol which is substituted in both ortho-positions as well as in the para-position to the hydroxy group by a halogen atom or an alkyl radical, but which contains at least one halogen atom and at least one free meta-position to the hydroxy group, to react upon each other in the presence of an acid condensation agent at a temperature of from about 15 to about 100° C. and for a time ranging from 3 hours to 2 days.

7. The process which comprises causing one molecular quantity of an aromatic aldehyde which may be substituted in the nucleus by a halogen atom, a nitro group or by a sulfonic acid group or a halogen atom and a sulfonic acid group and one molecular quantity of a phenol which is substituted in both ortho-positions as well as in the para-position to the hydroxy group by a halogen atom or an alkyl radical, but which contains at least one halogen atom and at least one free meta-position to the hydroxy group, to react upon each other in the presence of an acid condensation agent at a temperature of from about 15 to about 100° C. and for a time ranging from 3 hours to 2 days.

8. The process which comprises causing one molecular quantity of sodium benzaldehyde-para-sulfonate and one molecular quantity of 2,4,6-trichlorophenol to react upon each other in fuming sulfuric acid at about 8 to 11% for about 20 to 24 hours at about 30 to 40° C.

9. The process which comprises causing one molecular quantity of a hydrol obtained from one molecular quantity of para-sulfonated benzaldehyde and one molecular quantity of 2,4,6-trichlorophenol to react upon one molecular quantity of 2,4-dichlorophenol in the presence of sulfuric acid (95 to 90%) at a temperature of about 40 to 60° C. for about 2 days.

10. The compounds of the general formula:

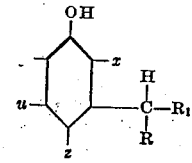

wherein $x$, $y$ and $z$ each stand for a halogen atom or an alkyl radical, but wherein at least one of these three substituents is a halogen atom, $u$ represents hydrogen or an alkyl radical which may be substituted by a halogen atom, $R$ stands for an aryl radical which may contain one or more monovalent substituents of the group consisting of a halogen atom, hydroxy group, nitro group and sulfonic acid group which sulfonic acid group may contain a metal or an equivalent thereof in place of hydrogen, and $R_1$ stands for hydrogen, a hydroxy group, an etherified or esterified hydroxy group or a phenolic radical which may contain substituents of the group consisting of halogen atoms and alkyl radicals, said compounds being generally colorless or nearly colorless powders which are almost insoluble in water except those which contain a sulfonic acid group and generally being highly efficacious in protecting wool, hair and the like against moths or other insect pests.

11. The compounds of the formula:

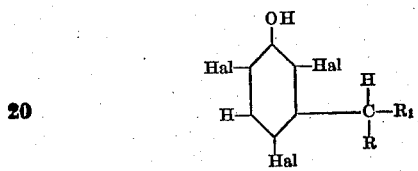

wherein Hal stands for a halogen atom, R stands for an aryl radical which may be substituted by halogen atoms and a hydroxy group, or by a nitro group, or by a sulfonic acid group, or by a halogen atom and a sulfonic acid group, which sulfonic acid groups may contain a metal or an equivalent thereof in place of hydrogen, and $R_1$ stands for hydrogen, a hydroxy group, an etherified or esterified hydroxy group or a phenolic radical which may be substituted by halogen atoms or by halogen atoms and an alkyl radical, said compounds being generally colorless or nearly colorless powders which are almost insoluble in water except those which contain a sulfonic acid group and being generally highly efficacious in protecting wool, hair and the like against moths or other insect pests.

12. The compounds of the general formula:

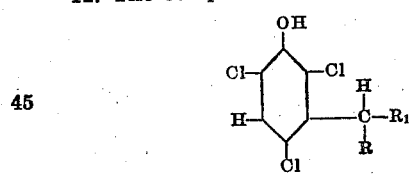

wherein R stands for a phenyl radical which is substituted by chlorine atoms and a hydroxy group or by a nitro group, or by a sulfonic acid group, or by a chlorine atom and a sulfonic acid group, which sulfonic acid groups may contain a metal in place of hydrogen, and $R_1$ stands for hydrogen, a hydroxy group, an esterified hydroxy group or a phenol radical which contains at least one halogen atom, said compounds being generally colorless or nearly colorless powders which are almost insoluble in water except those which contain a sulfonic acid group and generally being highly efficacious in protecting wool, hair and the like against moths or other insect pests.

13. The compounds of the general formula:

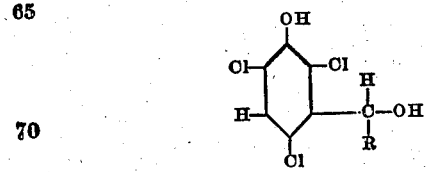

wherein R stands for a phenyl radical which may be substituted by a nitro group, or by a sulfonic acid group, which sulfonic acid group may contain a metal or an equivalent thereof in place of hydrogen, said compounds being generally colorless or nearly colorless powders which are almost insoluble in water except those which contain a sulfonic acid group.

14. The compounds of the general formula:

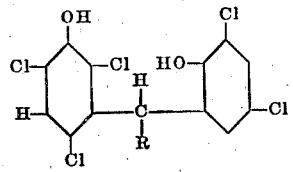

wherein R stands for a phenyl radical which may be substituted by a nitro group, or by a sulfonic acid group, which sulfonic acid group may contain a metal or an equivalent thereof in place of hydrogen, said compounds being generally colorless or nearly colorless powders which are almost insoluble in water except those which contain a sulfonic acid group and generally being highly efficacious in protecting wool, hair and the like against moths or other insect pests.

15. The compounds of the general formula:

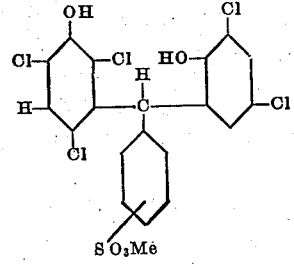

wherein Me stands for a metal, said compounds being generally colorless powders which are soluble in water and being highly efficacious in protecting wool, hair and the like against moths or other insect pests.

16. The compounds of the general formula:

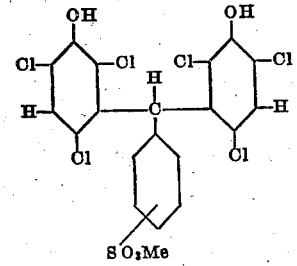

wherein Me stands for a metal, said compounds being generally colorless powders which are soluble in water and being highly efficacious in protecting wool, hair and the like against moths or other insect pests.

17. The compound of the formula:

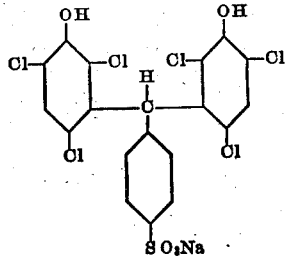

forming colorless crystals difficultly soluble in cold water and being highly efficacious in protecting wool, hair and the like against moths and other insect pests.

18. The compound of the formula:

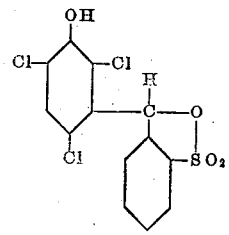

being a colorless crystalline powder melting at 237° C. almost insoluble in water but rather soluble in alcohol.

19. The compound of the formula:

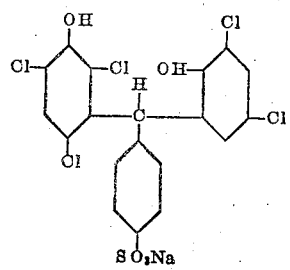

being a colorless substance soluble in water and highly efficacious in protecting wool, hair and the like against moths or other insect pests.

20. The process which comprises causing one molecular quantity of a hydrol obtained according to claim 5, and one molecular quantity of a phenol which may contain substituents of the group consisting of halogen atoms and alkyl radicals to react upon each other in the presence of an acid condensation agent.

21. The process which comprises causing one molecular quantity of a hydrol obtained according to claim 7, and one molecular quantity of a phenol which contains at least one halogen atom to react upon each other in the presence of an acid condensation agent at a temperature of from about 15 to about 100° C. and for a time ranging from about 3 hours to about two days.

MAX WEILER.